United States Patent
Baumgartner et al.

(10) Patent No.: US 9,585,092 B2
(45) Date of Patent: Feb. 28, 2017

(54) DISCONNECTION OF RESOURCES OF A RADIO ACCESS NETWORK WITH A LOW NETWORK LOAD

(71) Applicant: Vodafone Holding GmbH, Düsseldorf (DE)

(72) Inventors: Andreas Baumgartner, Chemnitz (DE); Thomas Bauschert, Munich (DE)

(73) Assignee: VODAFONE HOLDING GMBH, Dusseldorf (DE)

( * ) Notice: Subject to any disclaimer, the term of this patent is extended or adjusted under 35 U.S.C. 154(b) by 249 days.

(21) Appl. No.: 14/015,174

(22) Filed: Aug. 30, 2013

(65) Prior Publication Data
US 2014/0080493 A1 Mar. 20, 2014

(30) Foreign Application Priority Data

Sep. 3, 2012 (DE) .......................... 10 2012 215596

(51) Int. Cl.
*H04W 52/02* (2009.01)
*H04W 72/04* (2009.01)

(52) U.S. Cl.
CPC ....... *H04W 52/0206* (2013.01); *H04W 72/04* (2013.01)

(58) Field of Classification Search
CPC .. H04W 52/0206; H04W 72/04; H04W 52/02
USPC ...... 455/450, 63.1, 114.2, 343.2, 343.5, 423, 455/522; 370/311
See application file for complete search history.

(56) References Cited

U.S. PATENT DOCUMENTS

| 6,470,195 | B1 | 10/2002 | Meyer | |
| 7,167,681 | B2 * | 1/2007 | Kuurne et al. | 455/67.11 |
| 8,543,116 | B2 | 9/2013 | Zhang et al. | |
| 8,923,134 | B2 * | 12/2014 | Meredith et al. | 370/241 |

(Continued)

FOREIGN PATENT DOCUMENTS

| EP | 2141947 A1 | 1/2010 |
| EP | 2566258 A1 | 3/2013 |

(Continued)

OTHER PUBLICATIONS

Peng, Chunyi et al., Traffic-Driven Power Saving in Operational 3G Cellular Networks, MobiCom '11, Sep. 19-23, 2011, 12 pages, Las Vegas, Nevada, USA.

*Primary Examiner* — Allahyar Kasraian
*Assistant Examiner* — Farid Seyedvosoghi
(74) *Attorney, Agent, or Firm* — International IP Law Group, PLLC

(57) ABSTRACT

The techniques described herein relate ascertaining resources of a radio access network that can be switched off during low network utilization, wherein the method comprises ascertaining an overlap of at least one sector of a base station of the radio access network by at least one sector of a surrounding base station of the radio access network. At least one candidate sector is determined to be switched off as a function of the ascertained overlap, wherein the candidate sector is essentially completely covered by the at least one sector of the surrounding base stations. The techniques may include selection from among the candidate sectors a combination of sectors that are to be switched off, and switching off the candidate sectors of the selected combination.

14 Claims, 4 Drawing Sheets

(56) References Cited

U.S. PATENT DOCUMENTS

| | | |
|---|---|---|
| 9,042,264 B2 * | 5/2015 | Catovic .......................... 370/254 |
| 2011/0096687 A1 * | 4/2011 | Dottling et al. .............. 370/252 |
| 2011/0170466 A1 * | 7/2011 | Kwun ........................... 370/311 |
| 2012/0004009 A1 | 1/2012 | Lindoff et al. |
| 2012/0165063 A1 | 6/2012 | Scalia et al. |
| 2012/0244869 A1 * | 9/2012 | Song et al. .................... 455/449 |
| 2015/0319688 A1 * | 11/2015 | Matas Sanz ...... H04W 52/0206 |
| | | 455/574 |

FOREIGN PATENT DOCUMENTS

| | | |
|---|---|---|
| WO | 0207464 A1 | 1/2002 |
| WO | 2009011640 A2 | 1/2009 |
| WO | 2011031197 A1 | 3/2011 |
| WO | WO 2011046704 A2 * | 4/2011 |
| WO | 2011096867 A1 | 8/2011 |
| WO | 2011138346 A1 | 11/2011 |
| WO | 2012107930 A1 | 8/2012 |

* cited by examiner

DISCONNECTION OF RESOURCES OF A RADIO ACCESS NETWORK WITH A LOW NETWORK LOAD

CROSS-REFERENCE TO RELATED APPLICATIONS

This application claims priority to German (DE) Patent Application No. 102012215596.1, filed on Sep. 3, 2013 the contents of which are incorporated by reference as if set forth in their entirety herein.

BACKGROUND

An objective of the refinement of communication networks is to lower their energy consumption in order to reduce the environmental burden, and to improve the cost-effectiveness of the operation of communication networks. In the context of mobile telecommunications systems, the focus of energy savings is on the radio access network, which accounts for the highest share of the energy consumption in a mobile telecommunications system, namely, about 60% to 80%. Evaluations of traffic data of mobile telecommunications systems have shown that there is very little mobile telecommunications traffic, especially in the night hours and on weekends, as a result of which the existing capacities of radio access networks, which are generally dimensioned to handle the maximum network load, are only used to a small extent. Therefore, during such low-traffic periods, the potential exists to lower the energy consumption of the radio access network by using radio resources more efficiently.

The publication "Traffic-Driven Power Saving in Operational 3G Cellular Networks", by C. Peng et al. MobiCom 2011, proposes switching off selected base stations during low-traffic periods in order to reduce the energy required to operate the radio access network. A traffic-grid-based method is used to select the base stations that are to be switched off during the energy-saving mode of operation.

SUMMARY

The techniques described herein relate to switching off resources of a radio access network of a mobile telecommunications system during low network utilization. In particular, the techniques described herein relate to a method, a computer program and a system for ascertaining resources of a radio access network that can be switched off during low network utilization.

It is an objective of the techniques described herein to achieve the highest possible power savings during the energy-saving mode of operation by appropriately selecting the resources of a radio access network that are switched off during the energy-saving mode of operation of the radio access network.

According to a first aspect of the techniques described herein, a method is proposed for ascertaining the resources of a radio access network that can be switched off during low network utilization. The method comprises the following steps:

ascertaining an overlap of at least one sector of a base station of the radio access network by at least one sector of a surrounding base station of the radio access network, determining at least one candidate sector to be switched off as a function of the ascertained overlap, whereby the candidate sector is essentially completely covered by the at least one sector of the surrounding base station, and selecting from among the candidate sectors a combination of sectors that are to be switched off, and switching off the candidate sectors of the selected combination.

According to a second aspect, the techniques described herein proposes a computer program comprising a software code that is adapted in such a way that it can carry out the method and its embodiments when it is executed on a data processing system.

According to a third aspect, a system for ascertaining resources of a radio access network is proposed that can be switched off during low network utilization. The system includes an overlap module configured to ascertain an overlap of at least one sector of a base station of the radio access network by at least one sector of a surrounding base station of the radio access network. The system includes a determination module configured to determine at least one candidate sector to be switched off as a function of the ascertained overlap, whereby the candidate sector is essentially completely covered by the at least one sector of the surrounding base station. The system may include a selection module configured to select from among the candidate sectors a combination of sectors that are to be switched off, and to switch off the candidate sectors of the selected combination.

An advantage of the techniques described herein is that it is possible to ascertain individual sectors within a radio access network that are to be switched off during the energy-saving mode of operation of the radio access network. In this manner, the switch-off potential that exists in the radio access network is better utilized and the energy savings during the energy-saving mode of operation are increased. The term "sector" refers to the transmission and reception range of an antenna of a base station of the radio access network, or to the transmission and reception range of a so-called small cell (femtocell, picocell, microcell), whereby at least individual base stations can service several sectors through the use of several antennas. The term "switching off a sector" especially refers to the transition of resources servicing the sector into an operating state involving reduced energy consumption. For purposes of the switch-off procedure, resources can be, for example, switched off entirely or placed into a stand-by mode of operation.

In one embodiment of the method and of the system, it is provided that the overlap of a sector is determined on the basis of random sample points within the sector, and a candidate sector is ascertained when the random sample points in the candidate sector fall within sectors of surrounding base stations. This permits a numerical calculation of the overlap of sectors. In one embodiment, the random sample points can form a regular grid. If all of the random sample points of one sector are covered by another sector, then the coverage is essentially complete.

Another embodiment of the method and of the system provides that the overlap of one sector by another sector is ascertained as a function of the transmission range of the other sector, and the transmission range is determined as a function of at least one parameter of the associated sector. In one embodiment, the overlap is ascertained as a function of the transmission range of the overlapped sector. In order to ascertain the transmission range of a sector, which is also referred to here as the transmission radius, according to one embodiment of the method and of the system, a path loss model is used to determine the distance from the base station servicing the sector at which the path loss exceeds a given threshold value. The path loss model is selected, among other things, according to the transmission frequency used in the sector, whereby fundamentally, all path loss models that are generally known to the person skilled in the art and that are suitable can be used. In some embodiments, the transmission range is calculated by the path loss model as a function of the building density in the sector, so as to ensure a realistic calculation of the transmission radius. The transmission range can especially be determined as the distance from a base station at which the value for the reception strength falls below a certain threshold value. The threshold value can be prescribed as a function of a mobile telecommunications service such as, for instance, telephony, streaming of data or data transmission of a certain quality and speed, and it can especially be selected in such a way that the service can still be used with an adequate service quality. Depending on the mobile telecommunications service in question, the transmission radius or the transmission range of a sector can differ, since the mobile telecommunications services have different threshold values.

During normal operation, as a rule, the sectors of the radio access network do not have their maximum possible extension. In particular, the limitation of the extension serves to avoid interferences between various sectors. During the energy-saving mode of operation, however, the sector extension can be increased since, due to the fact that sectors have been switched off, less interference can occur. Therefore, in one embodiment of the method and of the system, it is provided that the overlap of the sector of the base station by a sector of a surrounding base station is ascertained on the basis of the configuration of the parameter of the sector of the surrounding base stations that maximizes the transmission range of the other sector. In this manner, the switch-off potential in the radio access network is better utilized.

In one embodiment, the parameter comprises the downtilt of the beam direction of the antenna of the surrounding base station that services the sector and/or the parameter comprises the transmission power of the antenna. The configuration of the parameter of a sector that maximizes the transmission radius includes the minimum downtilt of the beam direction of the antenna that services the sector and/or the maximum transmission power of the antenna.

Another embodiment of the method and of the system provides that, for the candidate sector, a configuration of the parameters of the sectors that cover the candidate sector is ascertained which, in the case of the smallest possible deviation from the configuration of the parameters during normal operation of the radio access network, leads to an essentially complete coverage of the candidate sector and it also provides that the ascertained configuration is established when the selected candidate sectors are switched off. The ascertained configuration can minimize possible interferences between sectors during the energy-saving mode of operation and, at the same time, it can ensure complete or almost complete network coverage by the sectors that remain switched on during the energy-saving mode of operation. In one embodiment, in order to ascertain the candidate sectors, it is provided to first assume maximum transmission radii of the surrounding sectors and then, in a subsequent step, to ascertain the above-mentioned optimized configuration of the overlapping sectors for each candidate sector.

In general, there are a number of possible combinations of candidate sectors that can be switched off during the energy-saving mode of operation. On the basis of prescribed criteria, the combinations selected from among the possible combinations are those that yield the highest possible energy savings.

In this context, an embodiment of the method and of the system provides that a combination of candidate sectors that are to be switched off is ascertained, whereby sectors that cover the candidate sectors contained in the switch-off combination are not switched off. In this manner, complete network coverage can be ensured during the energy-saving mode of operation.

Another embodiment of the method and of the device entails that a combination of candidate sectors that are to be switched off is ascertained in which no further sectors can be switched off without losing coverage for a partial area of the geographic area covered by the radio access network. As a result, it can be ensured that a maximum number of sectors are switched off during the energy-saving mode of operation.

Moreover, in one embodiment of the method and of the system, it is provided that a combination of candidate sectors that are to be switched off is ascertained that comprises a maximum number of base stations in which all of the sectors are candidate sectors. When all of the sectors of a base station are switched off, then, in addition to sector-specific components of the base station, it is also possible to switch off jointly used components that are associated with all of the sectors. The energy savings can be further increased by maximizing the number of base stations in which all of the sectors are switched off during the energy-saving mode of operation.

Another embodiment of the method and of the system is characterized in that the candidate sector and the sectors of the surrounding base stations covering the candidate sectors are associated with different radio access technologies and/or radio frequencies. This permits candidate sectors to be switched off, even when they are overlapped by sectors of a different radio access technology or radio frequency, so that the switch-off potential is further increased. For example, it can be provided that some of the base stations can be partially associated with a UTRAN (UMTS Terrestrial Radio Access Network) and partially with a GERAN (GSM/Edge Radio Access Network) or E-UTRAN (Evolved-UTRAN), or else it can be provided that the base stations are associated with the same radio access technology, but with different radio frequencies such as, for example, 800 MHz and 1.6 GHz in a UTRAN. By the same token, however, it can also be provided that the base stations are associated with the same radio access technology and/or that they use the same radio frequency, so that, when a sector is switched off, there is no need to change the mobile terminal devices to a different radio access technology and/or radio frequency.

The above-mentioned as well as other advantages, special features and practical refinements of the techniques described herein are also clearly explained on the basis of the embodiments that are described below with reference to the figures.

DETAILED DESCRIPTION OF EMBODIMENTS

Figure 1:
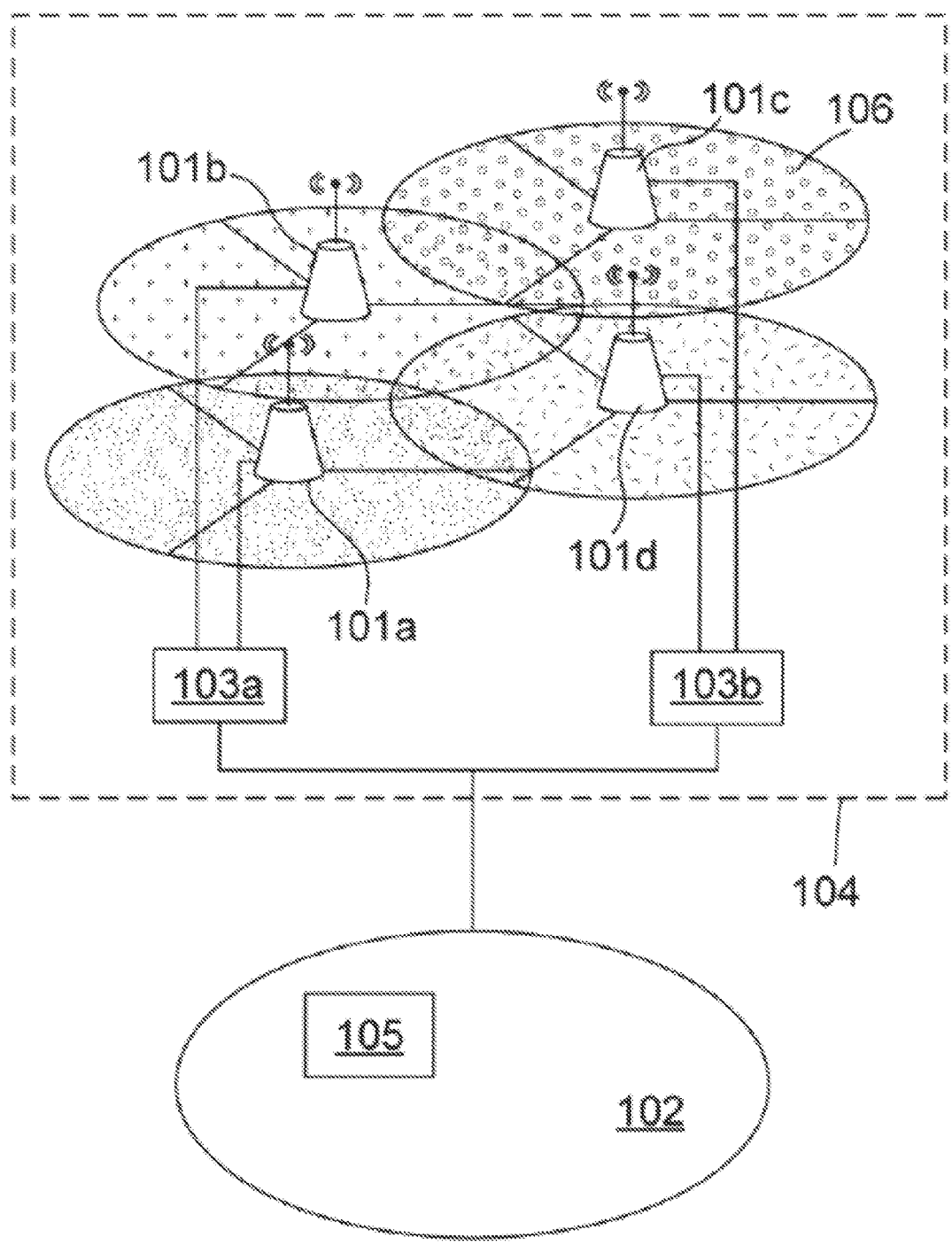
FIG. 1 is a schematic depiction of several base stations of a radio access network that is connected to a core network of a mobile telecommunications system.

FIG. 1 schematically shows a radio access network 104 of a cellular mobile telecommunications system that provides the infrastructure for establishing wireless connections between mobile terminal devices and the mobile telecommunications system, and it especially has a plurality of base stations 101i of which several are shown in FIG. 1 by way of example. The radio access network 104 is connected to a core network 102 of the mobile telecommunications network that comprises additional infrastructure for providing mobile telecommunications services that can include, for example, services for voice and/or video telephony as well as services for data transmission or for connection to data networks such as the Internet. The radio access network 104 is characterized in that, at a low utilization level of its radio resources, an energy-saving mode of operation can be activated in that selected radio resources are switched off. Here, in various embodiments, the radio access network 104 can be the entire radio access network of one or more mobile telecommunications operators or else a predefined part of the entire radio access network of one or more mobile telecommunications service providers. In particular, the radio access network 104 can include part of an entire radio access network in which the network utilization fluctuates as a function of the time of day and/or the day of the week, as is often the case, for instance, in built-up urban and industrial areas or else at certain large-scale events (sports, music, shows).

The base stations 101i (i=a, . . . , d) each service one or more sectors that correspond to radio cells of the radio access network 104 and that are each associated with an antenna for transmitting and receiving radio signals (in FIG. 1, the sectors of various base stations are cross-hatched differently to make them easier to distinguish). The radio cells or sectors 106 of the radio access network 104 can have different extensions. Here, at least some of the radio cells of the radio access network 104 can be configured as small cells (femtocells, picocells, or microcells) that are installed in areas where a high network utilization occurs temporarily. The base stations 101i shown by way of an example in FIG. 1 each service three sectors, whereby a sector of the base station 101i selected by way of example is designated by the reference numeral 106. In order to service several sectors, sector antennas are used in the base stations 101i that, in the case of three sectors, are arranged, for example, at an angular distance of 120. If a different number of radio cells are serviced by one base station 101i, then this base station 101i has an appropriately adapted antenna configuration. The antennas of a base station 101i are connected to additional components of the base station 101i that encompass antenna-specific or sector-specific components such as, for example, RRUs (Remote Radio Units) that are each associated with one antenna, as well as trans-sector components that are used in conjunction with all of the antennas of the base station 101i. In one embodiment, each of the base stations 101i is associated with a control unit 103a,b via which the base station 101i is connected to the core network 102. Here, several base stations 101i can each be connected to a control unit 103. The control units 103 can be provided in order to manage the base stations 101i and their radio resources and, in one embodiment, are responsible for the mobility management of the mobile terminal devices that are connected to the connected base stations 101i.

The radio access network 104 can comprise different radio access technologies. In particular, it can be a UTRAN according to a UMTS (Universal Mobile Telecommunications System) in which the base stations 101i are configured as NodeBs and the control units 103a,b are configured as RNCs (Radio Network Controllers). By the same token, the radio access network 104 can be configured as a GERAN, corresponding to a GSM (Global System for Mobile Communications), whereby the base stations 101i of the GERAN are configured as BTSs (Base Transceiver Stations) and the control units 103a,b are configured as BSCs (Base Station Controllers). In one embodiment, it can also be an E-UTRAN according to an LTE (Long Term Evolution) standard in which the base stations 101i are configured as eNodeBs. In another embodiment, it is a WLAN radio access network in which the base stations 101i form corresponding radio access points and it might be possible to dispense with additional control units. Beyond these examples, the radio access network 104 can also implement additional radio access technologies. In one embodiment, all of the base stations 101i of the radio access network 104 are associated with the same radio access technology or the same radio frequency. However, the radio access network 104 can likewise be made up of several partial access networks that are associated with different radio access technologies and/or radio frequencies and that can completely or partially cover each other spatially. Thus, for example, the radio access network 104 can also be made up of a combination of WLAN, GERAN, UTRAN and/or E-UTRAN radio access technologies. When different partial access networks are present, the mobile terminal devices used in the radio access network 104 are those that are suitable for connection with several radio access networks and that consequently can connect as desired to several of the partial access networks that are available. When a sector of a given radio access technology is switched off, such mobile terminal devices might be able to connect to the mobile telecommunications system via a sector of another radio access technology.

The radio access network 104 is set up in such a way that, during normal operation, it permits access at a sufficient data rate by a large number of mobile terminal devices that can be present during peak periods in the geographic area of the radio access network 104. In particular, this is achieved by a suitable cell structure of the radio access network 104, whereby in areas with a high maximum traffic volume, small cell sizes are provided for handling the maximum traffic volume by a limited number of available radio channels. As is also shown in FIG. 1, adjacent sectors overlap, at least partially. In sectors having the same radio technology, the overlap is especially provided in order to permit interruption-free handovers of radio connections between the sectors. If the radio access network 104 is made up of several partial networks having different radio access technologies, then—at least in some locations of the radio access network 104—service involving different radio access technologies is achieved through the overlap of the sectors of base stations 101i having different radio access technologies.

During low-traffic periods that can occur, for instance, at night and/or on weekends, as a rule, the available resources of the radio access network 104 are only utilized to a small extent, so that the resource utilization is low. Therefore, during the energy-saving mode of operation of the radio access network, it is provided to switch off selected sectors during low-traffic periods and, in this manner, to save the energy required to operate these sectors. The switch-off is carried out in that resources of the base stations 101i are set to an operating state in which they consume less energy than during normal operation. The switch-off can especially comprise the complete switch-off of resources of a base station 101i or it can comprise switching resources over to a stand-by mode of operation or to a similar operating state.

In one embodiment, transitions of the radio access network between the normal mode of operation and the energy-saving mode of operation are controlled by a network management unit 105 that is connected to the base stations 101i or to the control unit 103a, b associated with them, and that can be arranged, for example, in the core network 102 of the mobile telecommunications system. In one embodiment, the network management unit 105 receives measured data about the utilization level of the radio cells of the radio access network 102 [sic] that can be acquired, for example, in the base stations 101i, in the associated control units 103a,b, and/or in other units of the core network 102. During normal operation of the radio access network 104, the network management unit 105 checks on the basis of the measured data whether the conditions for a transition to the energy-saving mode of operation have been met. As an alternative or in addition, it can also be provided that previously acquired measured data is stored in the network management unit 105, on the basis of which regularly recurring switch-off times with a low traffic volume are obtained, or else such switch-off times can already be stored in the network management unit 105 instead of measured data. The recurring switch-off times can be, for instance, certain times of day such as nighttime and/or certain days of the week such as weekends.

If it is determined on the basis of measured data and/or on the basis of the stored switch-off times that the energy-saving mode of operation should be initiated, the network management unit 105 executes the switch-off of sectors and, if applicable the provided-for adaptations to the configuration of the base station 101i for the sectors that remain switched on during the energy-saving mode of operation. For this purpose, appropriate control signals are sent by the network management unit 101 to the base stations 101i or to the associated control units 103a, b. By the same token, on the basis of appropriate control signals that are sent to the base stations 101i or to the associated control units 103a, b, the network management unit 105 controls the transition from the energy-saving mode of operation to normal operation when, during the energy-saving mode of operation, the network management unit 105 determines on the basis of measured data about the network utilization levels that the conditions for a return to normal operation have been met.

The already existing overlap between sectors of the radio access network 104 is utilized when sectors are switched off. Moreover, it is provided to enlarge the extension or the transmission range of at least some of the sectors that have not been switched off. In this manner, a greater overlap of adjacent sectors is achieved and consequently, the switch-off potential is increased. During normal operation, as a rule, enlarging the extension of sectors would lead to undesired interferences between adjacent sectors. However, during the energy-saving mode of operation, such interferences do not occur due to the fact that certain sectors are switched off.

When sector antennas are used, the extension of a radio cell is due especially to the downtilt of the beam direction of the antenna that services the cell, whereby a slight downtilt results in a larger transmission range and thus a larger cell extension. The downtilt can be achieved by physically suspending the antenna body at an appropriate tilt relative to the vertical or else by the electric configuration of the antenna. The downtilt can be adapted during ongoing operation and this is done by an appropriate change in the tilt of the antenna body by a suitable motor actuator (Remote Mechanical Tilt—RMT) or by an adaptation of the electric properties of the antenna (Remote Electrical Tilt—RET). The downtilt can be fundamentally reduced to the minimum value at which the coverage of the sector is still ensured. The minimum downtilt is especially dependent on the height at which the antenna is installed, whereby antennas installed at a greater height permit a smaller minimum downtilt.

Moreover, the transmission radius or the transmission range depends on the transmission power of the antenna (and of the mobile stations in the radio cell serviced by the antenna). Therefore, as an alternative or in addition to the adaptation of the downtilt of the beam direction, the cell radius or the cell size can also be fundamentally changed by an adaptation of the transmission power of the antenna. However, in order to enlarge the transmission radius, it is necessary that the maximum transmission power of the antenna is not reached during normal operation, since otherwise, an increase in the transmission power would not be possible.

In order to select sectors that are switched off during the energy-saving mode of operation, first of all, overlapping areas of sectors of the radio access network 104 are ascertained. This is done by taking into account the maximum extension of the sectors. In one embodiment, this is ascertained on the basis of a numerical calculation that is consecutively carried out for all of the base stations 101i or sectors of the radio access network 104. In one embodiment, the calculation determines whether random sample points within the individual sectors are covered by adjacent sectors or not. The overlapping situation for the entire sector is then determined on the basis of the overlapping situations ascertained for each of the random sample points of a sector.

In one embodiment, the transmission range in a sector that corresponds to the cell radius of the sector is defined as the distance from the antenna that is associated with the sector at which the path loss in the transmission direction of the antenna exceeds a threshold value. The threshold value corresponds to the maximum permissible path loss and is selected as a function of the mobile telecommunications services that are supposed to be accessible in the energy-saving mode of operation. This particularly takes into account the fact that mobile telecommunications services that require a higher data transmission rate or a high service quality will call for a higher receiving level at the receiving location in question.

The path loss is determined on the basis of the propagation loss of the radio signal as well as on additional factors such as the antenna gain and the feed losses. A path loss model that is familiar to the person skilled in the art is used to calculate the propagation loss. Such a model can be used to determine the propagation loss—initially without including the downtilt—on the basis of the employed transmission frequency and on the basis of the known installation height of the antenna above the ground (for the receiving height, a uniform predefined estimated value can be used for all sectors). Moreover, the building density in the geographic area of the sector is taken into consideration. If the radio access network 104 is a UTRAN, then the COST 231 Hata model can be used for the calculation in that the path loss can be determined as a function of the characteristics of the building density of the area in question, or else the COST Walfish Ikegami model can be used.

Figure 2:
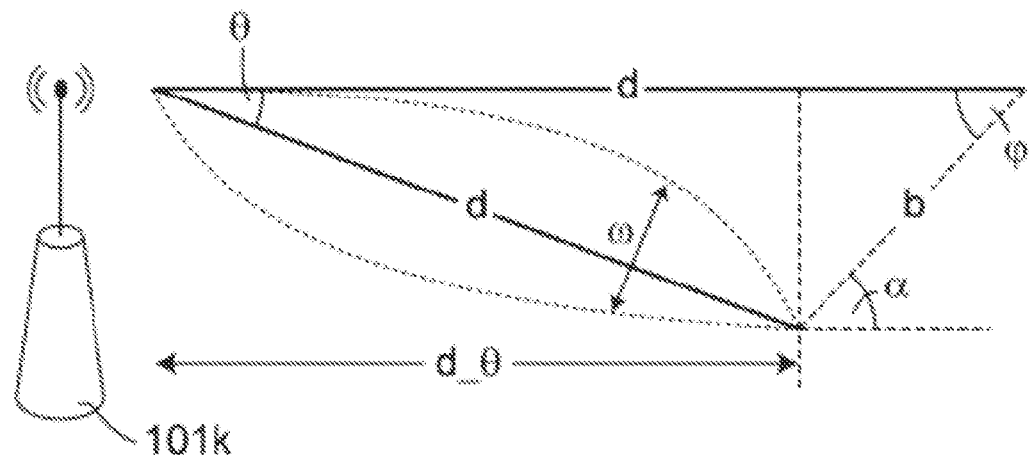
FIG. 2 is a diagram to illustrate the calculation of the transmission radius as a function of the downtilt of the beam direction.

The influence of the downtilt of the beam direction on the transmission radius is illustrated in FIG. 2 for a base station $101k$. According to the diagram shown there, the transmission radius $d\_\theta$, which results from a downtilt $\theta$ of the beam direction, can be determined on the basis of the following relationship from the transmission radius d which was previously calculated using the above-mentioned path loss model:

$$d\_\theta = d - b \cdot \cos(\alpha),$$

wherein the following holds true:

$b = \sqrt{2d^2 - 2d^2 \cdot \cos(\theta)}$
$\alpha = 180° - \theta - \phi$
$\phi = (180° - \theta)/2$ The angles $\theta$ $\alpha$ and $\omega$ as well as the transmission radii $d\_\theta$ and d are shown in FIG. 2. In one embodiment, the above-mentioned relationship is used to determine the transmission radius $d\_\theta$ for a certain downtilt of the beam direction in a sector. In another embodiment, the vertical beam extension $\overline{\omega}$ is taken into consideration in the calculation of the transmission radius. In this embodiment, instead of the downtilt $\theta$, the expression $v - \overline{\omega}/2$ is used in the formulas given above.

In a model, the geographic area covered by the sectors is described by a suitable geometric shape whose extension is determined on the basis of the transmission radius that was ascertained in the above-mentioned manner. The geographic areas that are covered by the individual sectors of a base station $101i$ are ascertained on the basis of individual transmission radii that are each calculated as a function of the sector-specific building density. When it comes to sector antennas, it is especially the case that circular segments whose radii correspond to the ascertained transmission radii can be assumed as the shape of the areas. In one implementation, it is provided to describe the spatial extension of the sector serviced by a sector antenna by three circular segments that are adjacent to each other and that have different radii. In other embodiments, the spatial extension can also be described by more than three, that is to say, for example, by 10 or 50 adjacent circular segments having different radii. Moreover, modeling can also be carried out using a building density map of the geographic area in question by ray tracing methods.

Figure 3:
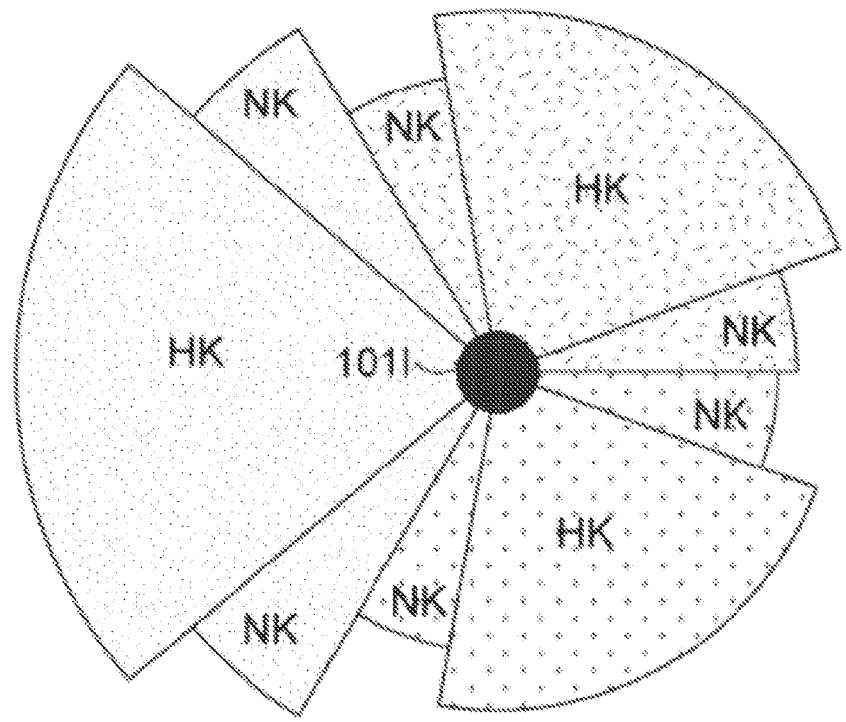
FIG. 3 is a schematic representation of a model description of sectors of a base station.

By way of an example, FIG. 3 shows a model configuration with three circular segments for a base station $101l$ that services three sectors. The middle circular segment HK of each sector represents its main transmission lobe of the antenna associated with the sector and it has a predefined angle extension in some embodiments. The radius of the middle circular segment HK corresponds to the previously ascertained transmission radius. The two outer circular segments NK of each sector represent the secondary transmission lobes. The calculation of the transmission radii of the secondary transmission lobes of a sector is based on a predefined secondary lobe attenuation that determines the radius of the circular segments and this can especially be 3 dB. If a sector is not serviced by a sector antenna but rather by a differently configured antenna, then the sector is modeled by a correspondingly adapted shape, whereby, in case of an omnidirectional antenna, this can be a circular disk.

In order to ascertain the overlapping situation for a certain base station $101i$, which will be referred to below as the main location, first of all, a preselection is made among the base stations $101i$ whose sectors can overlap the sectors of the main location due to their cell radii. Here, for the main location, the cell radii are used as the basis, taking into consideration the downtilts of the beam directions during normal operation, while for the other base stations $101i$, enlarged cell radii that are obtained as a result of a minimum downtilt of the beam directions are used as the basis. The base stations $101i$ ascertained during the preselection are also referred to below as the adjacent locations. In one embodiment, the base stations $101i$ selected as adjacent locations are those for which the sum of the maximum cell radius of the base station $101i$ (S_max,i) and of the maximum transmission radius of the main location (S_max) corresponds to at least the distance Di between the base station $101i$ and the main location, that is to say, where the following applies:

$$S\_\max, i + S\_\max \geq Di$$

Here, the maximum of the cell radii of the base stations $101i$ is referred to as the maximum cell radius of a base station $101i$.

Once the adjacent locations of the main location have been ascertained during the preselection, the sectors that are completely overlapped by one or more sectors of the adjacent locations are ascertained. These sectors are also referred to below as candidate sectors to be switched off. The determination is carried out on the basis of the geographic positions of the locations and on the basis of the geographic areas covered by their sectors. For this purpose, the geographic areas that are covered by the sectors of the main location are once again determined on the basis of the downtilts of the beam directions during normal operation, whereas the geographic areas covered by the sectors of the adjacent locations are calculated on the basis of the minimum downtilt of the beam directions. Aside from the overlapped sectors of the main location, the determination can also ascertain the sectors of the adjacent locations that ensure the coverage of the overlapped sectors of the main location and here, they are also referred to as the overlapping sectors.

In one embodiment, the candidate sectors of the main location and the overlapping sectors of the adjacent locations are ascertained by individual calculations of the overlap at prescribed random sample points. In one embodiment, the basis for this is an equidistant grid of random sample points covering the sectors of the main location or covers the geographic area covered by these sectors. For each of the random sample points, a checking procedure is performed as to whether it falls within a sector of an adjacent location and, if so, in which sector of an adjacent location it lies. Then a checking procedure is performed for each of the sectors of the main location as to whether all of the random sample points arranged in the sectors fall within a sector of an adjacent location. The sectors of the main location for which this is the case constitute candidate sectors to be switched off during the energy-saving mode of operation. Moreover, at least for the random sample points of the candidate sectors, the sectors of the adjacent locations that cover the random sample points and that form the overlapping sectors of the candidate sectors are ascertained and stored, so that the appertaining overlapping sectors for each candidate sector can also be stored.

A maximum transmission range is taken as the basis for determining the candidate sectors and this transmission range results from a minimum downtilt of the beam directions in the overlapping sectors. However, it has been found that a complete overlap of the candidate sectors can often also be achieved with a small transmission range or with a greater downtilt. Thus, particularly in overlapping sectors where the beam direction has a greater downtilt during normal operation, it is often not necessary to set the minimum downtilt. Rather, it is often possible to set a downtilt that entails a smaller deviation from the downtilt during normal operation. Setting a smaller transmission range has the advantage that interferences during the energy-saving mode of operation of the radio access network 104 are prevented or minimized.

Therefore, once the candidate sectors to be switched off have been ascertained, in another step, an optimized configuration of the downtilts of the beam directions in the overlapping sectors is determined for each candidate sector. The optimized configuration is ascertained in such a way that the candidate sector is completely covered and, in the overlapping sectors, the deviations of the downtilt to be set are, at the same time, minimal in comparison to the downtilts during normal operation. For this purpose, the overlap of the candidate sector by the overlapping sectors is calculated for various combinations of downtilts of the beam directions in the overlapping sectors, and from these results, the optimal configuration is selected, which will also be referred to below as the switch-off configuration. The calculation can be carried out in the manner already described above on the basis of random sample points within the candidate sector.

In one embodiment, in order to determine the switch-off configuration of the downtilts of the beam directions in the overlapping sectors, the overlap of the candidate sector is calculated for all possible permissible combinations of downtilts of the beam directions of the overlapping sectors (for example, with a one-degree rasterization of the downtilts). Then the combinations at which a complete overlap of the candidate sector exists are selected. From among these, the combination selected is the one with which the changes of the downtilts of the beam directions in the overlapping sectors are minimal in comparison to the downtilts during normal operation.

A calculation of the overlap for all possible combinations of downtilts of the beam directions in the overlapping sectors, however, is very calculation-intensive and time-consuming Therefore, in an alternative embodiment, a heuristic technique is used to determine the switch-off configuration, which is explained with reference to FIG. 4. For a given candidate sector, the determination is made on the basis of a list of previously ascertained overlapping sectors. This list is sorted according to the number of random sample points of the candidate sector that are covered by the individual overlapping sectors. Here, the first place is occupied by the overlapping sector that covers the largest number of random sample points of the candidate sector; the second place is occupied by the overlapping sector that covers the second largest number of random sample points, and so forth. As an alternative, however, it is also possible to sort the list differently, especially also to sort it randomly.

In one embodiment, the heuristic method provides that, for the overlapping sectors, in each case, the maximum downtilt of the beam direction is determined at which the candidate sector is completely covered. Moreover, for each overlapping sector, starting from the maximum downtilt in this sector, the maximum downtilts at which the candidate sector is completely covered are consecutively ascertained for the optionally present other overlapping sectors. Thus, for each overlapping sector, one obtains a configuration of downtilts in all of the overlapping sectors of the candidate sector. From among the individual configurations, the configuration selected is the one at which the deviations for the configuration of the downtilts are minimal in all of the overlapping sectors. In order to ascertain the maximum downtilt in an overlapping sector, the downtilt of the beam direction in the overlapping sector, starting from the minimum downtilt, is increased incrementally, and after each increase, the overlap of the candidate sector is determined in the manner described above. Here, increases are carried out until, in a given step, there is no longer complete coverage of the candidate sector. The maximum downtilt then corresponds to the downtilt that had been taken as the basis in the next-to-last step.

Figure 4:
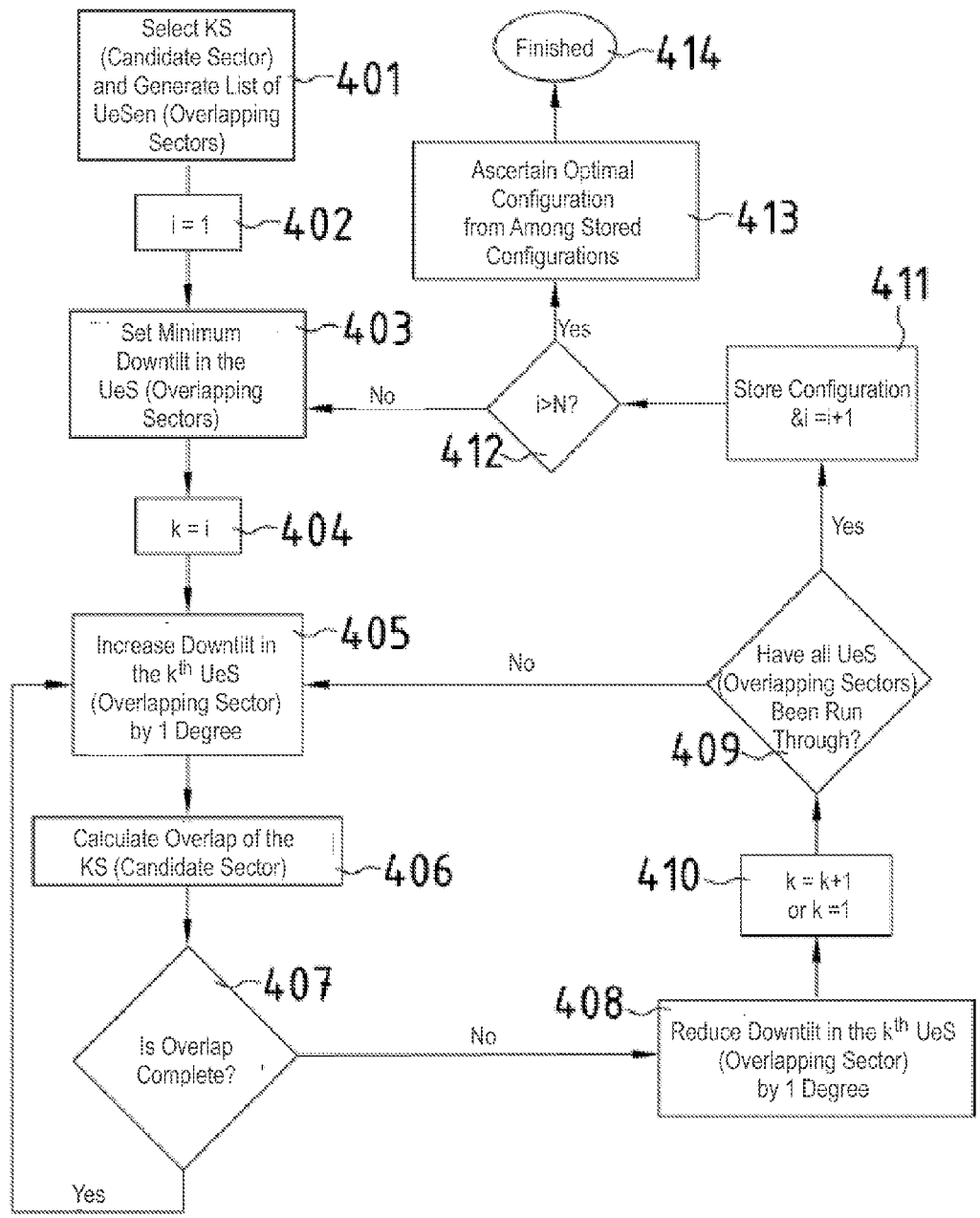
FIG. 4 is a schematic flow diagram of a heuristic technique for ascertaining an optimized configuration of downtilts for overlapping sectors of a candidate sector.

FIG. 4 schematically shows the heuristic method on the basis of a flow diagram. First of all, in Step 401, the candidate sector (KS) for which the determination is to be carried out is selected. Furthermore, in Step 401, the previously described list of overlapping sectors (UeSen) is generated for this candidate sector, whereby it is assumed that this list comprises N overlapping sectors. Then, calculations that each yield a configuration of maximum downtilts for the various overlapping sectors (UeS) of the list are carried out consecutively. The calculation of a configuration for the first overlapping sector is carried out first. For this purpose, the counter i is set to the value 1 in Step 402.

The calculation of a configuration of maximum downtilts for an overlapping sector is carried out beginning with a starting configuration in which the minimum downtilts are set in all of the overlapping sectors. This starting configuration is set in Step 403. The calculation of the configuration of maximum downtilts for the $i^{th}$ overlapping sector starts with the determination of the maximum downtilt for the $i^{th}$ overlapping sector. For this reason, in Step 404, first of all, the counter k that determines the overlapping sector for which the maximum downtilt is ascertained is set to the value i. Once the maximum downtilt for the $i^{th}$ overlapping sector has been determined in Step 408, the maximum downtilt for the next overlapping sector (k=i+1) is taken as the basis by using the determined downtilt for the $i^{th}$ overlapping sector. Then the calculation of the maximum downtilt for the remaining overlapping sectors of the list is consecutively continued, until in Step 409, it is determined that all of the overlapping sectors have been run through. The maximum downtilt for a given overlapping sector is calculated by taking the previously ascertained downtilts of the preceding overlapping sectors as the basis. In order to run through all of the overlapping sectors, in Step 410, the value of the counter k is increased by the value 1 for each run or else it is set back to the value 1 after the end of the list of overlapping sectors has been reached. All of the overlapping sectors are run through, that is to say that, for each i, the list of overlapping sectors is completely run through. Once all of the overlapping sectors have been run through, the configuration made up of the maximum downtilts ascertained for the individual overlapping sectors is stored in Step 411.

In order to determine the maximum downtilt in the $k^{th}$ overlapping sector, the downtilt is increased—first starting from the minimum downtilt that is present in the initial configuration of Step 405—by a prescribed value of, for instance, 1 degree (Step 405). Then, in the manner described above, the overlap of the candidate sector by the overlapping sectors is calculated, making use of the random sample points (Step 406). Subsequently, in Step 407, a checking procedure is performed as to whether complete coverage of the candidate sector by the overlapping sectors exists. Steps 405-407 are repeated until it is ascertained in Step 407 that there is no complete overlap of the candidate sector. Then, in Step 408, the sector for the $k^{th}$ overlapping sector is reduced by the prescribed value.

In the manner described above, a configuration of maximum downtilts is determined for each overlapping sector of the candidate sector. If it is determined in Step 412 that such a configuration is present for all of the overlapping sectors, then in Step 413, on the basis of the previously ascertained and stored configuration, the configuration is determined in which the changes of the downtilts in the overlapping sectors are minimal in comparison to the downtilt that is set during normal operation. Once this configuration has been ascertained, the method for the candidate sector in question is complete (Step 414).

In the manner described above, for each sector of the radio access network 104, a determination is made as to whether it is a candidate sector. In this way, all candidate sectors and the associated overlapping sectors of the radio access network 104 are determined. Moreover, for each ascertained candidate sector, a configuration of the downtilts of the beam directions in the overlapping sectors is ascertained. Based on this information, combinations of candidate sectors that are to be switched off are then determined according to prescribed criteria.

In other embodiments, as an alternative or in addition to the optimization of the transmission radii of the overlapping sectors, an adaptation of the transmission power is carried out (if the maximum transmission power is not being used during normal operation) by adapting the downtilts of the beam directions. For this purpose, the approach taken is analogous to the adaptation of the sectors. In other words, first of all, the overlap of the sectors of the radio access network 104 is determined on the basis of a minimum transmission power in order to ascertain the candidate sectors to be switched off in the energy-saving mode of operation. This is done in the manner described above on the basis of an individual calculation for random sample points in the sectors. Once the candidate sectors have been ascertained, optimal configurations of the transmission power for the overlapping sectors are ascertained and, in these configurations, the transmission power differs minimally from the transmission power during normal operation. For this purpose, the above-mentioned heuristic method can be carried out analogously. Moreover, if the transmission power of the overlapping sectors has been adapted, then the optimization serves to minimize interferences that can arise if the transmission radii of the overlapping sectors are too large. After the candidate sectors and the optimized transmission power have been ascertained, in this embodiment as well, the switch-off combinations for the energy-saving mode of operation are ascertained, that is to say, the combination of the candidate sectors that are to be switched off in the energy-saving mode of operation. An adaptation of the transmission power for increasing the transmission range is especially advantageous for those overlapping sectors whose antenna already has a slight downtilt during normal operation. Moreover, the mechanism for adapting the transmission radius can be selected as a function of the type of antenna being used in a given case. In particular, it can be provided that the transmission radius is adapted by changing the transmission power if this is not possible by changing the antenna tilt, which is the case, for example, with omnidirectional antennas.

Figure 5:
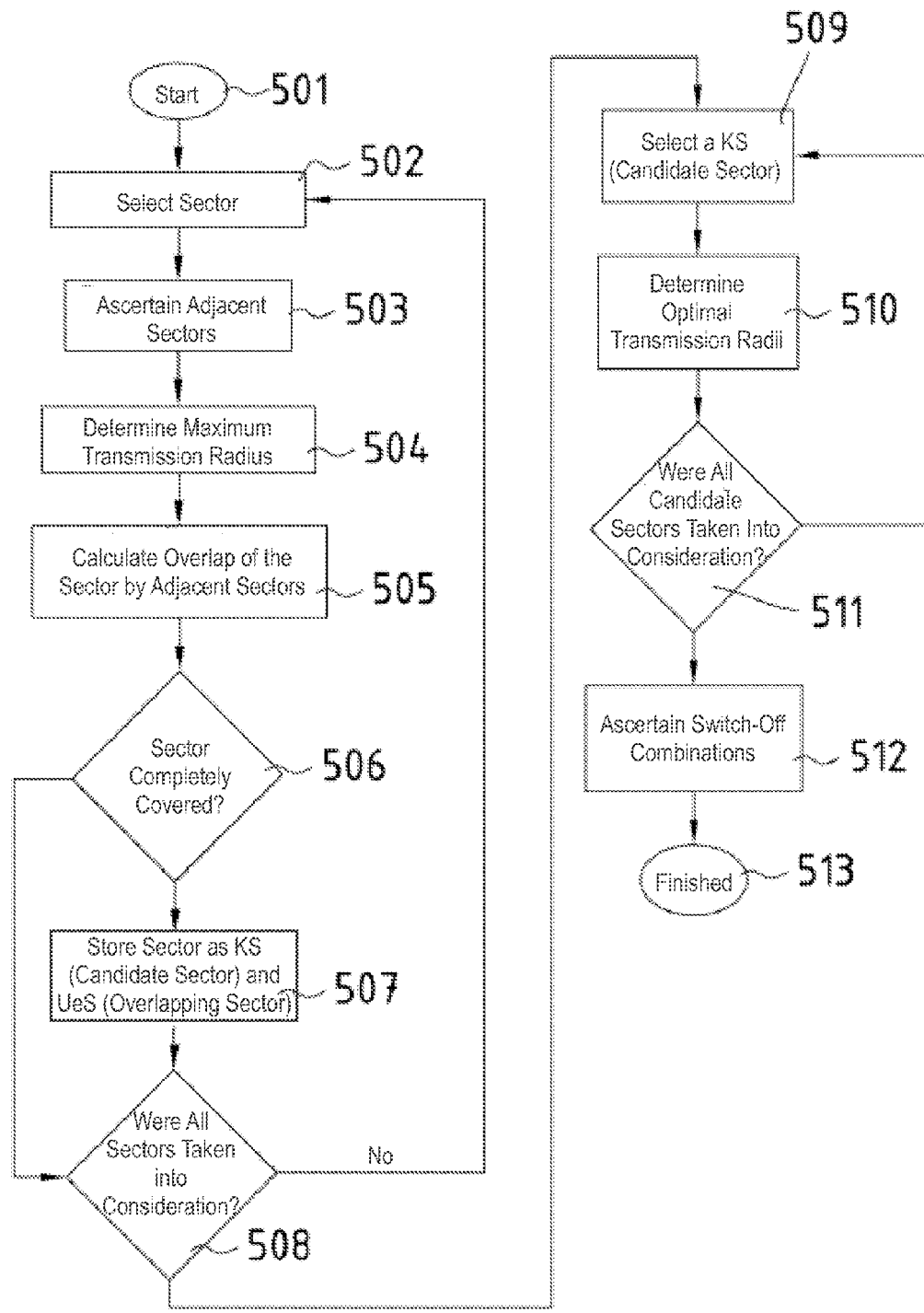
FIG. 5 is a schematic flow diagram with steps for ascertaining a combination of sectors of the radio access network that are to be switched off.

Thus, the switch-off combinations are ascertained as is schematically shown in FIG. 5 on the basis of a flow diagram. After the initiation (Step 501), first of all, the candidate sectors are ascertained. For this purpose, in Step 502, a sector is first selected. For the selected sector, in Step 503, the adjacent sectors selected are those that are options as overlapping sectors of the sector. This is done in the manner described above by preselecting the adjacent locations of the base station that services the sector. Then, in Step 505, the overlap of the sector is calculated on the basis of individual calculations for random sample points in the sector. This is done by using the maximized transmission radii of the sectors of the adjacent locations that are determined on the basis of the minimum downtilt of the beam directions in the sectors and/or on the basis of the maximum transmission power. After the calculation of the overlap, a checking procedure is performed in Step 506 as to whether the selected sector is completely covered. If this is the case, then the sector is stored as a candidate sector. The associated overlapping sectors, along with a candidate sector, are also stored (Step 507). Steps 502-507 are carried out for all of the sectors of the radio access network 104. For this purpose, in Step 508, after the examination of each sector, a checking procedure is performed as to whether all of the sectors have been taken into consideration. If this is not the case, then another sector is selected in Step 502.

If it is determined in Step 508 that all of the sectors have been taken into consideration, then the optimization of the transmission radii of the overlapping sectors is subsequently carried out for the ascertained candidate sectors. This is done consecutively for each individual candidate sector. For this purpose, in Step 509, first of all, a candidate sector is selected. Then, with respect to this candidate sector, a configuration of the transmission ranges of the overlapping sectors is ascertained in Step 510, in which the candidate sector is completely covered and the deviations of the transmission radii are minimal during normal operation. The adaptation of the transmission radii is carried out as described above by changing the downtilt of the beam directions in the overlapping sectors and/or by changing the transmission power of the antennas that service the overlapping sectors. Steps 509 and 510 are carried out for all of the previously ascertained candidate sectors. In order to ensure this, in Step 511, after the examination of each candidate sector, a checking procedure is performed as to whether all of the candidate sectors have been taken into consideration. If this is not the case, then another sector is selected in Step 509.

If it is determined in Step 511 that a configuration of optimal transmission radii of the overlapping sectors has been ascertained for all of the candidate sectors, then in Step 512, the switch-off combinations for the operation of the radio access network 104 in the energy-saving mode of operation are ascertained before the method is completed in Step 513.

The switch-off combinations are ascertained on the basis of prescribed criteria that are defined in such a way that a gap-free radio coverage is retained during the energy-saving mode of operation throughout the geographic area that is covered by the radio access network 104 during normal operation. Furthermore, on the basis of the criteria, the switch-off combinations ascertained are those that lead to the greatest possible energy savings as compared to normal operation. Such switch-off combinations are also referred to below as maximum switch-off combinations. A switch-off combination comprises the candidate sectors that are to be switched off as well as the appertaining configuration of the downtilts and/or of the transmission power of the overlapping sectors of the candidate sectors that are to be switched off. If an overlapping sector is associated with several candidate sectors of a switch-off combination, then several configurations of the downtilt and/or of the transmission power can be present for the overlapping sector, said configurations each having been ascertained for a different candidate sector. In this case, the configuration with the largest transmission radius is selected within the switch-off combination in order to ensure a gap-free coverage of the geographic area covered by the radio network.

Among the possible switch-off combinations, in one embodiment, the switch-off combinations ascertained as the maximum switch-off combinations are those that meet the following criteria:

a) the overlapping sectors of the candidate sectors that are to be switched off are not switched off in the switch-off combination,
b) no other candidate sectors can be switched off without losing the complete network coverage,
c) as many base stations 101i as possible are switched off completely (that is to say, all of the sectors of the base station 101i are switched off), and the number of switched-off individual sectors is at a maximum.

Criterion a) ensures gap-free network coverage since it prevents sectors from being switched off that, in turn, are needed in order to service switched-off sectors. Criterion b) ensures that a maximum number of sectors are switched off in the energy-saving mode of operation. Criterion c) takes into account the fact that, aside from the sector-specific components that are associated with individual sectors, the base stations 101i also comprise jointly used components. If all of the sectors of a base station 101i are switched off, then the jointly used components can also be switched off, which is not possible if individual sectors are switched off. Thus, Criterion c) translates into greater energy savings.

The maximum switch-off combinations can be determined, for example, numerically in that all or the majority of switch-off combinations are examined individually. For these switch-off combinations, it is then ascertained whether the above-mentioned conditions have been met. One switch-off combination is selected from among the ascertained maximum switch-off combinations and this is stored in the network management unit 105. The maximum switch-off configuration can likewise be ascertained in the network management unit 105 or else in a data processing system that is connected to the network management unit 105 and that is given access to the requisite input quantities such as, for instance, the geographic locations of the base stations 101i and the relevant configuration parameters of the base stations 101i. The switch-off combination can then be fundamentally used until a new calculation becomes necessary due to a change in the network configuration, which can occur, for example, as a result of an augmentation to and/or distance from the base stations 101i.

If the conditions for initiating the energy-saving mode of operation are present, then the network management unit 105 controls the switch-off of the candidate sectors that are included in the selected switch-off combination, and it also controls the adaptation of the transmission radii for the other sectors. Here, it can be provided that the transmission power is incrementally decreased in the sectors that are to be switched off in order to reduce the transmission radii of these sectors, and the increase of the transmission radii of the overlapping sectors takes place essentially synchronously. This ensures gap-free network coverage, even during the switch-off procedure. The energy-saving mode of operation can especially be initiated when the network management unit 105 has evaluated the traffic measured data of the radio access network 104 and ascertained that the network load in the candidate sectors of the stored switch-off combination and the appertaining overlapping sectors is so low that mobile terminal devices in the candidate sectors can be taken over by the overlapping sectors and that there is still a sufficient capacity reserve, even after they have been taken over.

Based on the approach described above, especially switch-off combinations for an entire radio access network 104 or for one or more partial networks of a radio network comprising a plurality of base stations 101i can be ascertained and set to the energy-saving mode of operation. By the same token, configurations of overlapping sectors can be determined for individual sectors of the radio access network 104 so as to ensure complete network coverage in case of failure of the sectors due to a fault or due to maintenance work. In order to ascertain such a configuration for a selected sector, in the approach described above, this sector is taken as the only candidate sector. Then, first of all, a checking procedure is performed for this sector as to whether it is an option as a candidate sector because of an overlap by adjacent sectors (corresponding to Steps 502-507 described above). If this is the case, then an optimal configuration of the downtilts and/or transmission power is determined (corresponding to Steps 509 and 510). In this case, no switch-off combinations are ascertained.

The person skilled in the art can glean additional variants of the techniques described herein and their execution from the preceding disclosure, from the figures and from the claims.

Although the techniques described herein have been described in detail in the figures and in the presentation given above, the elucidations merely serve as an illustration and as an example, and should not be construed in a limiting manner. In particular, the techniques described herein are not limited to the explained embodiments.

In the claims, terms such as "encompass", "comprise", "contain", "have" and the like do not exclude additional elements or steps. The use of the indefinite article does not preclude the plural. An individual module can execute the functions of several of the units or modules cited in the claims. The reference numerals given in the claims are not to be construed as a limitation of the techniques and steps employed.

What is claimed is:

1. A method for ascertaining resources of a radio access network that can be switched off during low network utilization, the method comprising:
ascertaining an overlap of at least one sector of a base station of the radio access network by at least one sector of a surrounding base station of the radio access network;
determining at least one candidate sector to be switched off as a function of the ascertained overlap, wherein the candidate sector is essentially completely covered by the at least one sector of the surrounding base station;
repeating the steps of ascertaining overlaps and determining candidate sectors;
selecting from among the determined candidate sectors a combination of candidate sectors that is to be switched off, and switching off the candidate sectors of the selected combination; and
ascertaining a configuration of parameters of sectors that cover the combination of candidate sectors to be switched off, wherein the ascertained configuration of parameters of the radio access network leads to an essentially complete coverage of the combination of candidate sectors to be switched off, wherein the ascertained configuration of parameters is different than a configuration of parameters of the radio access network during normal operation of the radio access network, wherein a deviation of the ascertained configuration of parameters is minimized in comparison to the configuration of parameters of the radio access network during normal operation of the radio access network when the combination of candidate sectors is switched on such that interference between sectors which are switched on when the combination of candidate sectors is switched off is minimized, and wherein the ascertained configuration is established when the selected combination of candidate sectors to be switched off is switched off.

2. The method according to claim 1, wherein the overlap of a sector is determined on the basis of random sample points within the sector, and a candidate sector is ascertained when the random sample points in the candidate sector fall within sectors of surrounding base stations.

3. The method according to claim 1, wherein the overlap of one sector by another sector is ascertained as a function of the transmission range of the other sector, and the transmission range is determined as a function of at least one parameter of the associated sector.

4. The method according to claim 3, wherein the parameter comprises a downtilt of the beam direction of the antenna of the surrounding base station that services the sector and/or the parameter comprises the transmission power of the antenna.

5. The method according to claim 1, wherein, in order to ascertain the transmission range of a sector, a path loss model is used to determine the distance from the base station servicing the sector at which the path loss exceeds a given threshold value.

6. The method according to claim 1, wherein the overlap of the sector of the base station by a sector of a surrounding base station is ascertained on the basis of a configuration of the parameter of the sector of the surrounding base stations that maximizes the transmission range of the other sector.

7. The method according to claim 6, wherein the parameter comprises a downtilt of the beam direction of the antenna of the surrounding base station that services the sector and/or the parameter comprises the transmission power of the antenna.

8. The method according to claim 7, wherein the configuration of the parameter of a sector that maximizes the transmission range comprises the minimum downtilt of the beam direction of the antenna that services the sector and/or the maximum transmission power of the antenna.

9. The method according to claim 1, wherein a combination of candidate sectors that are to be switched off is ascertained, whereby sectors that cover the candidate sectors contained in the switch-off combination are not switched off.

10. The method according to claim 1, wherein the combination of candidate sectors that are to be switched off is ascertained in which no further sectors can be switched off without losing coverage for a partial area of the geographic area covered by the radio access network.

11. The method according to claim 1, wherein the combination of candidate sectors that are to be switched off is ascertained that comprises a maximum number of base stations in which all of the sectors are candidate sectors.

12. The method according to claim 1, wherein the candidate sector and the sectors of the surrounding base stations covering the candidate sectors are associated with different radio access technologies.

13. A non-transitory computer-readable medium having code stored thereon, that when executed by a processing device causes the processing device to:

ascertain an overlap of at least one sector of a base station of the radio access network by at least one sector of a surrounding base station of the radio access network;
determine at least one candidate sector to be switched off as a function of the ascertained overlap, wherein the candidate sector is essentially completely covered by the at least one sector of the surrounding base station;
repeat the steps of ascertaining overlaps and determining candidate sectors;
select from among the determined candidate sectors a combination of candidate sectors that are to be switched off, and switching off the candidate sectors of the selected combination; and
ascertain a configuration of parameters of sectors that cover the combination of candidate sectors to be switched off, wherein the ascertained configuration of the parameters of the radio access network leads to an essentially complete coverage of the combination of candidate sectors to be switched off, wherein the ascertained configuration of parameters is different than a configuration of parameters of the radio access network during normal operation of the radio access network, wherein a deviation of the ascertained configuration of parameters is minimized in comparison to the configuration of parameters of the radio access network during normal operation of the radio access network when the combination of candidate sectors is switched on such that interference between sectors which are switched on when the combination of candidate sectors is switched off is minimized, and wherein the ascertained configuration is established when the selected combination of candidate sectors to be switched off is switched off.

14. A system for ascertaining resources of a radio access network that can be switched off during low network utilization, wherein the system comprises:

overlap module to ascertain an overlap of at least one sector of a base station of the radio access network by at least one sector of a surrounding base station of the radio access network;
determination module to determine candidate sectors to be switched off as a function of the ascertained overlaps, whereby each candidate sector is essentially completely covered by the at least one sector of the ascertained surrounding base station; and to ascertain a configuration of parameters of the sectors that cover a combination of candidate sectors to be switched off, wherein the ascertained configuration of parameters is different than a configuration of parameters of the radio access network during normal operation of the radio access network, wherein the ascertained configuration of the parameters of the radio access network leads to an essentially complete coverage of the combination of candidate sectors to be switched off wherein a deviation of the ascertained configuration of parameters is minimized in comparison to the configuration of parameters of the radio access network during normal operation of the radio access network when the combination of candidate sectors is switched on such that interference between sectors which are switched on when the combination of candidate sectors is switched off is minimized;
selection module to select from among the determined candidate sectors the combination of candidate sectors that are to be switched off, and to switch off the candidate sectors of the selected combination; and establishing module to establish the ascertained configuration of the sectors that cover the combination of candidate sectors to be switched off when the selected is switched off.

* * * * *